United States Patent [19]

Inohara et al.

[11] 4,307,521

[45] Dec. 29, 1981

[54] SHOE SOLE

[75] Inventors: Masanobu Inohara, Akashi; Yoshio Ueno, Kobe, both of Japan

[73] Assignee: Asics Corporation, Kobe, Japan

[21] Appl. No.: 913,757

[22] Filed: Jun. 8, 1978

[30] Foreign Application Priority Data

Dec. 13, 1977 [JP] Japan .................................. 52-49299
Jan. 25, 1978 [JP] Japan .................................... 53-6519

[51] Int. Cl.³ ...................... A43B 13/04; A43B 13/16
[52] U.S. Cl. ...................................... 36/31; 36/32 R; 36/59 C; D2/320; D2/321
[58] Field of Search ............ 36/32 R, 31, 30 R, 25 R, 36/59 R, 59 A, 59 C, 103, 114; D2/320, 321; 264/241, 244, 245, 248; 128/581

[56] References Cited

U.S. PATENT DOCUMENTS

| D. 137,439 | 3/1944 | Incardona | D2/321 |
|---|---|---|---|
| D. 163,012 | 4/1951 | Yaggi | D2/321 |
| D. 240,340 | 6/1976 | Askew | D2/320 |
| D. 241,484 | 9/1976 | Castano | D2/320 |
| 3,165,841 | 1/1965 | Rollman | 36/30 R |
| 3,971,145 | 7/1976 | Stegerwald | 36/32 R |

FOREIGN PATENT DOCUMENTS

| 660551 | 5/1938 | Fed. Rep. of Germany | 128/581 |
|---|---|---|---|
| 2360334 | 6/1975 | Fed. Rep. of Germany | 36/103 |
| 828437 | 2/1938 | France | 36/32 R |
| 132750 | 9/1919 | United Kingdom | 36/59 C |
| 473286 | 10/1937 | United Kingdom | 36/59 C |

OTHER PUBLICATIONS

Runner's World, Oct. 1978, pp. 52–53.

Primary Examiner—James Kee Chi

[57] ABSTRACT

A shoe sole having at least one strip of protuberant wall or ridge formed on its ground-contacting surface so as to divide said surface into at least two sections, said adjacent sections being made from different shoe sole materials in color or in quality.

5 Claims, 8 Drawing Figures

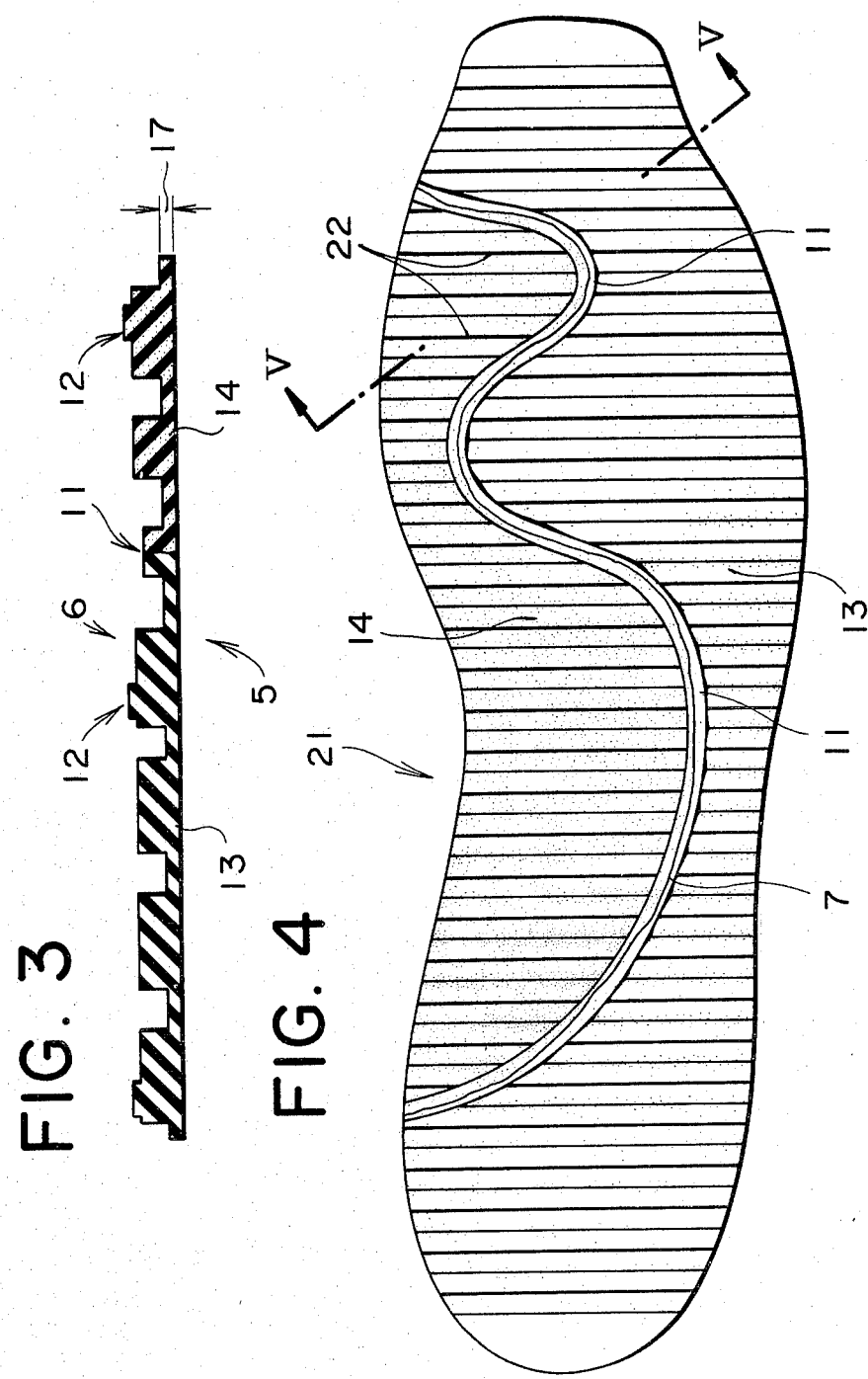

SHOE SOLE

This invention relates to a shoe sole of which the ground-contacting surface is divided into at least two sections, with such sections being formed from materials of different qualities or different colors so that a distinct demarcation line or lines will be formed on the ground-contacting surface. The invention is also intended to provide a method of producing such shoe sole.

There is known a so-called two-tone color shoe sole. The ground-contacting surface of such shoe sole is sectioned with different colors to produce a design effect. Such two-tone color sole is molded by charging the materials with different colors simultaneously into the cavity of a closed mold and compressing the materials with a press plate while heating the mold. During molding of such shoe sole, the flowing direction of the materials in the mold cannot be controlled, so that the materials could be jumbled together around the boundary to make it hard to obtain a desired demarcation line or lines that give a distinct color division. Consequently, the obtained shoe sole has only poor decorative design effect and hence is low in commercial value.

Therefore, there has been generally employed a method in which a ridge (or ridges) is formed at that part (or parts) of the cavity of said mold which corresponds to the color demarcation line (or lines) on the shoe sole and, after feeding the materials with different colors into the respective sections divided by said ridge(s), said materials are subjected to molding under heating. However, in the shoe sole formed by such conventional method, particularly in case the sole is small in thickness, the color demarcation line portion of the sole formed by the presence of the ridge is recessed and becomes even smaller in thickness, so that a fissure or rip may develop from such recessed thin portion in use. If the height of the ridge is decreased so as to prevent such break of the shoe sole, it becomes difficult to form a clear color demarcation line.

These problems also arise when the shoe sole is formed by using the materials of different types or qualities instead of the materials with different colors. It suggests itself as a good measure to use a rubber material with high wear resistance at the part of the shoe sole where a high foot force is applied, while using a rubber material with relatively low wear resistance at the non-stepped portion where no much foot force is exerted. In this case, both materials are heated and fused together during molding, and when the material boundary portion is recessed as in the above-said case, such portion may rip because of small thickness, and also a crack or fissure may develop in the fused area as such area is narrow.

An important object of this invention is to provide a shoe sole which is made from two or more materials of different qualities or different colors and formed with a strip or strips of protuberant wall or ridge along the boundary of the materials to make the thickness of such boundary portion large enough to prevent ripping or cracking in such portion.

Another object of this invention is to provide a shoe sole in which the material demarcation line is formed along the boundary between the part where the foot force is applied in a greater amount and the part where such force is exerted in a smaller amount.

Another important object of this invention is to provide a method of molding a shoe sole by using a concave mold (female mold) having a recessed groove or furrow at the position corresponding to the material boundary portion of the sole, wherein two or more different types of materials are charged into said mold and heated and pressed therein so that the materials on both sides of said recessed groove will be forced into said groove simultaneously, while controlling such flow of the materials by the wall surface of said groove so that each material won't mix into the sphere of the other material.

Thus, according to the present invention which has the above-said objects, there is provided a shoe sole which is formed on its ground-contacting surface with a strip or strips of protuberant wall that divides said ground-contacting surface into at least two sections, with one section of the adjoining two sections being constituted from different sole material from the other section.

The other objects and advantages of the present invention will become apparent from the following detailed description and accompanying drawings, in which:

FIG. 3 is a sectional view taken along the line III—III of FIG. 2;

FIG. 4 is a bottom view showing another embodiment of the shoe sole according to this invention;

Figure 6A:
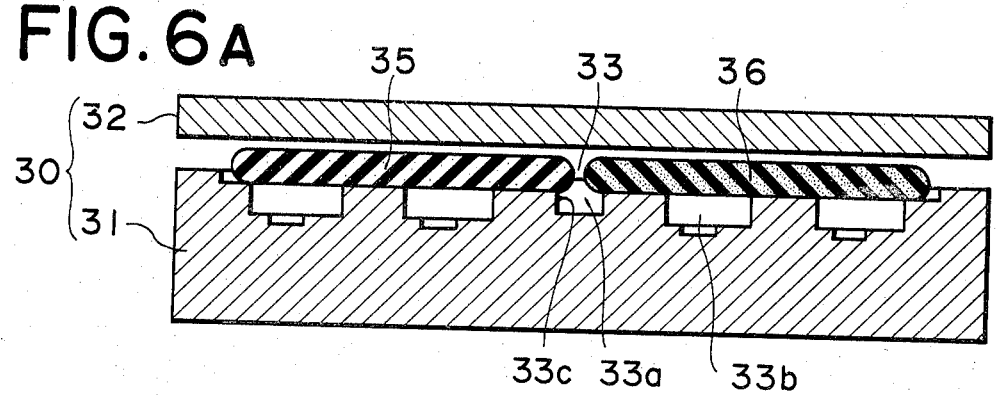
Figure 6B:
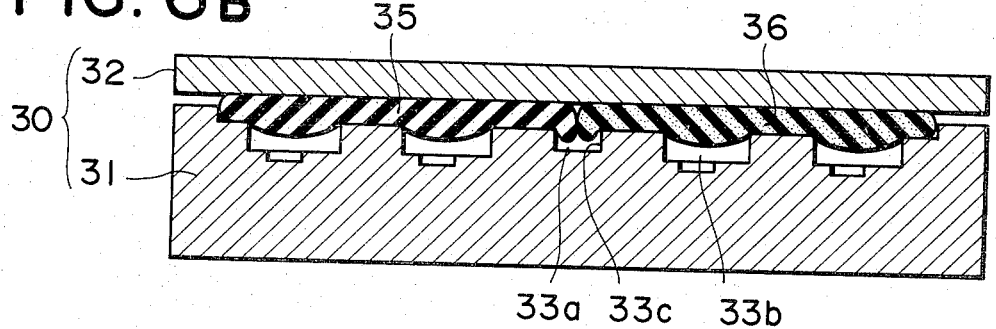
Figure 6C:
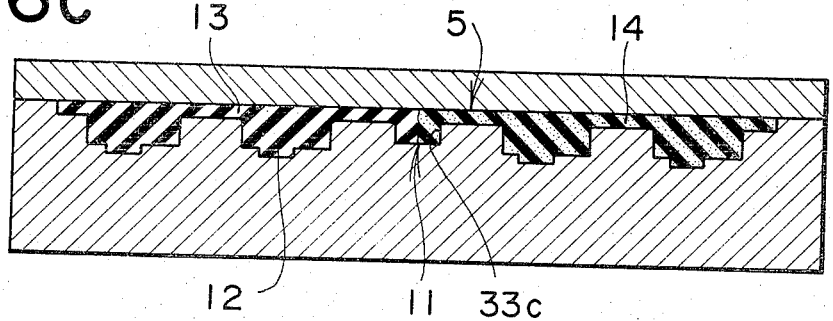

FIG. 6 shows a process for producing a shoe sole in accordance with this invention, wherein FIG. 6A is a sectional illustration showing a condition where two different kinds of material were charged into the mold, FIG. 6B is a sectional illustration showing a condition in the course of heating and pressing, and FIG. 6C is a sectional illustration of a condition where the molding of a shoe sole has been just completed.

Figure 1:
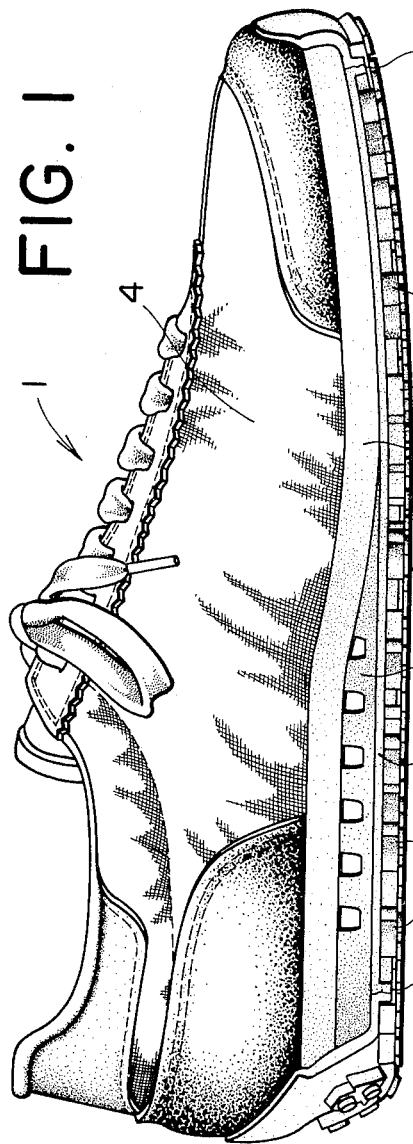
FIG. 1 is a side view of a sports shoe adapted with the sole of the present invention.

Referring to FIG. 1, there is shown a sports shoe comprising an insole 2 joined to the underside of the instep 4, an elastic intermediate member 3 jointed to the heel portion on the underside of the insole 2, and an outsole (ground-contacting bottom sole) joined to the underside of the intermediate member 3 and the underside of the front portion of the insole 2. The term "shoe sole" is used in this invention to refer to said outsole 5. There is available a shoe sole of the type formed by integrally molding said insole 2, intermediate 3 and outsole 5. The shoe sole of this invention includes such type and is intended to mean any member which substantially forms a ground-contacting surface 6.

Figure 2:
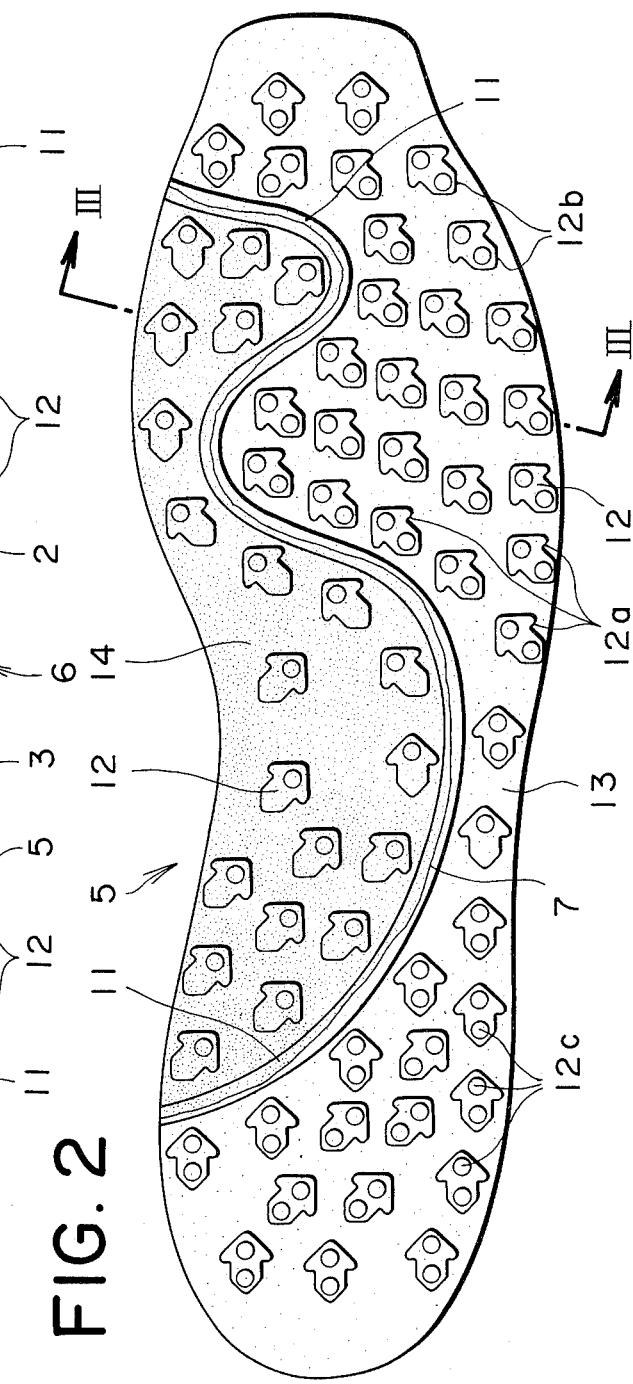
FIG. 2 is a bottom view showing an embodiment of the shoe sole according to the present invention.

On the bottom surface of the outsole 5, that is, on the ground-contacting surface 6 of the shoe sole are formed a strip of protuberant wall or ridge 11 and a plurality of creeper protuberances 12 as apparent from FIGS. 1 to 3. Said ridge 11 is positioned on the boundary line 7 which divides the outsole 5 into a first section 13 and a second section 14 which are made from the different materials (the materials of different qualities or different colors).

Said shoe sole 5 may be made of any suitable material such as natural rubber, synthetic rubber or a thermoplastic resin which forms a rubber-like elastic body, and these materials may be used either singly or in combination. In case of differentiating the first section 13 and the second section 14 by color, said both sections may be same quality or different quality from each other. In case of forming said both sections from different materials, it is recommended to use a material with high wear resistance for the first section where a great amount of foot force is applied to cause an excessive degree of wear, while using a highly elastic material or an inexpensive material for the second section where no much foot force is exerted.

Said ridge 11 is formed along the boundary between the first and second sections. If the boundary line 7 demarcates the part where the foot force is applied strongly and the part where no much foot force is exerted as shown in FIG. 2, said ridge proves particularly useful in case the shoe sole is formed from different materials as said before. Said ridge or protuberant wall 11 is lower than the creeper protuberances 12, but since the thickness of this wall portion is greater than that (17) of other parts of the shoe sole, there is provided a wider area of fusion of both materials, and hence there is little possibility that a crack or rip should develop from the fused portion in use. Also, the ridge 11, when curved as shown in FIG. 2, takes a slip-preventive effect.

As described above, it is possible with this invention to produce a shoe sole with excellent decorative effect by using the materials of different colors, or a shoe sole with functional and economical advantages and improved wear resistance particularly at the part where strong foot force is exerted, by using the materials of different qualities.

It is possible to form the shoe sole by using three or more different kinds of materials by forming a corresponding number of strips of or branched ridges 11.

In the embodiment shown in FIG. 2, said creeper protuberances 12 are of sagittal form and one or two round lobes 12c are formed on the surface of each of said protuberances 12. As shown in FIG. 2, the directions of the respective sagittal protuberances are decided in conformity to the manner in which the ground-contacting surface 6 of the shoe sole comes into contact with the ground. The ground-contacting area transfers successively forwardly from the heel, so the sagittal protuberances are formed in the direction of such transfer. According to this arrangement, the bent-in portions 12a and rear end portions 12b of the sagittal protuberances 12 produce a greater effect of preventing slip on the ground surface to improve the antislip effect of the shoe sole.

Figure 5:
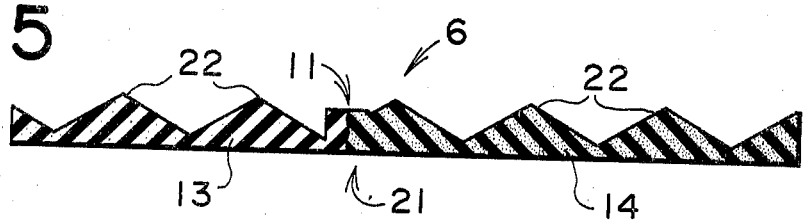
FIG. 5 is a sectional view taken along the line V—V of FIG. 4.

Referring now to FIGS. 4 and 5, there is shown another embodiment of the shoe sole according to this invention. The shoe sole 21 of this embodiment differs from that of the embodiment of FIGS. 1 to 3 only in the configuration of the creeper protuberances and is same as the foregoing embodiment in that the sole is formed from the first section 13 and second section 14 and is provided with a ridge 11 which demarcates said both sections. On the bottom surface of the shoe sole 21 are formed the serrate or jagged protuberances 22. It will be noted that various shapes of creeper protuberances may be provided even when a strip or strips of demarcating wall or ridge is formed on the shoe sole.

Now the method of producing the above-said shoe sole of this invention is described with reference to FIGS. 6A to 6C.

The mold 30 consists of a female mold 31 and a press plate 32. The female mold 31 is formed with a cavity 33 while the press plate 32 is formed from a single piece of flat plate. Said cavity 33 includes a groove 33a for forming the protuberant wall or ridge and a plurality of recessions 33b for forming the creeper protuberances.

Reference numerals 35 and 36 indicate the materials for forming the first section 13 and second section 14, respectively. Preferably, these materials 35, 36 are previously formed into a configuration similar in plane surface to said first and second sections 13, 14 to be formed.

First, said materials 35, 36 are charged into the cavity 33 of said female mold 31 and the press plate 32 is placed thereover (FIG. 6A). Then the mold 30 is heated to a suitable temperature and the press plate 32 is forcedly moved in the direction of the mold 31. The suitably heated and compressed materials flow in the cavity 33 and get into the groove 33a and recessions 33b (FIG. 6B).

The materials 35, 36 existing around the boundary are forced into the groove 33a as shown in FIG. 6B. In this case, the forced-in materials are controlled in their direction of flow by the wall surfaces 33c, 33c of the groove 33a so that one material won't get into the area of the other material. Both materials which have filled the groove 33a in the said way are fused to each other in the groove 33a, thereby forming the ridge 11 which demarcates the two sections. Thus, each material is forced into the groove before any one material fills the groove, and thereby a demarcation line (fused plane) is formed positively in the groove portion.

In this way, said both materials 35, 36 fill the cavity 33 including the groove 33a and recessions 33b to form the first section 13 and the second section 14, respectively, to thereby produce a shoe sole of a desired configuration (FIG. 6C).

As described above, according to the method of this invention, the materials 35, 36 which are in flux under heating and pressure move toward each other and toward groove 33a positioned therebetween, and after impinging against each other or slightly before such impingement, they flow down into and fill the groove 33a since such groove is formed just at the position where said impingement takes place. Since the thus forced-in materials are checked by the wall surfaces 33c of the groove 33a, they fuse with each other in the groove 33a without getting jumbled and one protuberant wall or ridge is formed. Even if both materials have a difference in the distance of movement from the outer periphery to the boundary line, both materials positively flow into the groove 33a before said groove is filled up by any one of the materials, so that the fused plane of both materials is securely and correctly positioned in the groove, allowing production of a shoe sole with a wide fused area.

What is claimed is:

1. In a shoe sole having formed on its ground-contacting surface at least one strip of protuberant wall or ridge which demarcates said ground-contacting surface into at least two section, the material of one section of said adjoining two sections having different color and/or quality from the material of the other section, the improvement comprising said adjoining two sections being fused together during molding in said strip of protuberant wall or ridge, thereby preventing the separation of the adjoining sections prevented.

2. A shoe sole according to claim 1, wherein said strip of protuberant wall or ridge demarcates its ground-contacting surface into two parts, one adapted for a strong treading force and the other adapted for a light treading force in use.

3. A shoe sole according to claim 2 including a plurality of creeper protuberances formed on said ground-contacting surface in addition to said strip.

4. A shoe sole according to claim 3, wherein said plurality of creeper protuberances extend from the ground-contacting surface of shoe a greater distance than said strip.

5. A shoe sole according to claim 4, wherein said plurality of creeper protuberances are configured like arrowheads, said arrowhead protuberances being formed in great number from the heel part to the toe part and all of said arrowhead protuberances being in conformity to the direction of transfer of the area of contact of the ground-contacting surface of the sole with the ground.

* * * * *

UNITED STATES PATENT AND TRADEMARK OFFICE
CERTIFICATE OF CORRECTION

PATENT NO. : 4,307,521
DATED : December 29, 1981
INVENTOR(S) : Masanobu Inohara et al It is certified that error appears in the above-identified patent and that said Letters Patent are hereby corrected as shown below:

Col. 4, line 59 change "section," to --sections,--, and in line 65 delete "prevented".

Signed and Sealed this

Sixteenth Day of March 1982

[SEAL]

Attest:

GERALD J. MOSSINGHOFF

Attesting Officer   Commissioner of Patents and Trademarks